Patented Nov. 8, 1949

2,487,299

UNITED STATES PATENT OFFICE 2,487,299

MANUFACTURE OF NITRILES

Richard B. Bishop, Haddonfield, and William I. Denton, Woodbury, N. J., assignors to Socony-Vacuum Oil Company, Incorporated, a corporation of New York No Drawing. Application December 6, 1947, Serial No. 790,234

11 Claims. (Cl. 260—465)

This invention relates to a process for producing nitriles, and is more particularly concerned with a catalytic process for producing nitriles from primary alcohols.

Nitriles are organic compounds containing combined nitrogen. Their formula may be represented thus: R—C≡N, in which R is an alkyl, aryl or other organic group. These compounds are very useful since they can be converted readily to many valuable products such as acids, amines, aldehydes, esters, etc.

As is well known to those familiar with the art, several processes have been proposed for the preparation of nitriles. In general, however, all of these processes have been disadvantageous from one or more standpoints, namely, the relatively high cost of the reactants employed and/or the toxic nature of some of the reactants and/or the number of operations involved in their ultimate preparation. For example, aliphatic nitriles have been synthesized by oxidizing hydrocarbons to acids followed by reacting the acids thus obtained with ammonia in the presence of silica gel. Other methods involve reacting alkyl halides with alkali cyanides, reacting ketones with hydrogen cyanide in the presence of dehydration catalysts, etc. Aromatic nitriles have been synthesized by reacting alkali cyanides with aromatic sulfonates or with aromatic-subsituted alkyl halides; by reacting more complex cyanides such as potassium cuprous cyanide, with diazonium halides; by reacting isothiocyanates with copper or with zinc dust; and by reacting aryl aldoximes with acyl halides.

We have now found a process for producing nitriles which is simple and inexpensive, and which employs non-toxic reactants.

We have discovered that nitriles can be prepared by reacting primary alcohols with ammonia, at elevated temperatures, in the presence of catalytic material containing an oxide of molybdenum, preferably molybdic oxide.

Our invention is to be distinguished from the conventional processes for the production of hydrogen cyanide wherein carbon compounds, such as carbon monoxide, methane, and benzene, are reacted with ammonia at elevated temperatures in the presence of alumina, nickel, quartz, clays, oxides of thorium and cerium, copper, iron oxide, silver, iron, cobalt, chromium, aluminum phosphate, etc. The process of the present invention is also to be distinguished from the processes of the prior art for the production of amines wherein hydrocarbons are reacted with ammonia at high temperatures, or at lower temperatures in the presence of nickel.

Our invention is also to be distinguished from the processes disclosed in United States Letters Patents 2,337,421 and 2,337,422, according to which primary alcohols are reacted with ammonia in the presence of catalysts containing either silver or copper. Copper containing catalysts supported on alumina show a tendency to fall off very rapidly in effectiveness. Silver catalysts show less of this tendency but are quite susceptible to poisoning and therefore not entirely satisfactory.

Roland H. Goshorn in United States Letters Patent 2,394,516 discloses that ammonia has been alkylated with alcohols in the presence of numerous metal oxides and salts to produce amines. He indicates that not only are amines formed but also considerable quantities of nitriles and olefins. He then proceeds to disclose how amines may be prepared by passing ammonia and an alkylating agent over molybdenum oxide supported on aluminum oxide or the like at a temperature of between 300 and 400° C. In accordance with the present process nitriles rather than amines or mixtures are produced and the process conditions are therefore obviously different.

Accordingly, it is an object of the present invention to provide a process for the production of nitriles. Another object is to afford a catalytic process for the production of nitriles. An important object is to provide a process for producing nitriles which is inexpensive and commercially feasible. A specific object is to provide a process for producing nitriles from primary alcohols. Other objects and advantages of the present invention will become apparent to those skilled in the art from the following description.

Broadly stated, our invention provides an inexpensive and commercially feasible process for the production of nitriles, which comprises reacting a primary alcohol with ammonia, in the gaseous phase and at elevated temperatures, in the presence of catalytic material containing an oxide of molybdenum, preferably molybdic oxide.

Generally speaking, any primary alcohol is suitable as a reactant in the process of our invention. It is preferred, however, to use primary alcohols containing not less than two or more than eighteen carbon atoms, since these are known to be particularly susceptible to this process. Ethyl alcohol, n-propyl alcohol, n-butyl alcohol, 2-methyl propyl alcohol, benzyl alcohol, decanol-1, tetradecanol-1, and octanol-1 may be cited as examples of satisfactory starting materials. Branching of the hydrocarbon chain of the alcohol does not interfere with the reaction of this invention but secondary and tertiary alcohols do not have a sufficient number of valence bonds available to form nitriles. However, it is possible for cracking to occur and lower molecular weight nitriles be formed from secondary and tertiary alcohols of high molecular weight. Polyhydric alcohols in which one or more of the alcohol radicals is attached to a primary carbon atom will react in accordance with this invention. For example, a di-nitrile may be formed from glycol or a polynitrile from such materials as pentaerythritol. Mixtures of alcohols as well as single pure alcohols may be used.

It will be understood also, that hydrocarbon mixtures containing one or more primary alcohols may be used herein, and that when such mixtures are used, the reaction conditions, such as contact time, will be slightly different in view of the dilution effect of the non-reactive constituents present.

The proportions of reactants, i. e., primary alcohols and ammonia, used in our process may be varied over a wide range with little effect on the conversion per pass and ultimate yield. In general, the charge of reactants may contain as little as 10 mol per cent or as much as 90 mol per cent of primary alcohols. In practice, however, we prefer to use charges containing between about 10 mol per cent and about 40 mol per cent of primary alcohols, or at least charges containing some molar excess of ammonia over the primary alcohol reactant.

We have found that the catalysts to be used to produce nitriles by reacting primary alcohols with ammonia, are those containing oxides of molybdenum, such as molybdenum sesquioxide ($Mo_2O_3$), molybdenum dioxide ($MoO_2$), molybdenum trioxide ($MoO_3$) and molybdenum pentoxide ($Mo_2O_5$). Molybdenum oxide catalysts, and particularly molybdic oxide catalysts, are more stable, do not lose their activity, and they are not as easily poisoned, as such catalysts as nickel oxide on silica gel, silver, or silver promoted with copper. Furthermore, such catalysts as nickel oxide on silica gel tend to cause the formation of amines whereas molybdic oxide catalysts do not.

We prefer to use molybdenum trioxide, which is commonly designated molybdic oxide. In the interest of brevity, it should be clearly understood that when we speak of molybdenum oxide herein and in the claims, we have reference to the various oxides of molybdenum. While all of these molybdenum oxides are operative in the present process, they are not equivalent in their effectiveness from the standpoint of catalytic activity, molybdenum trioxide being more effective than the other oxides of molybdenum and consequently being the preferred catalytic material.

While these molybdenum oxides exhibit different degrees of effectiveness when used per se, they generally possess additional catalytic activity when used in conjunction with the well-known catalyst supports, such as alumina, silica gel, carborundum, pumice, clays and the like. We especially prefer to use activated alumina ($Al_2O_3$) as a catalyst support, and we have found that a catalyst comprising a molybdic oxide supported on activated alumina is particularly useful for our purpose. Without any intent of limiting the scope of the present invention, it is suspected that the enhanced catalytic activity of the supported catalysts is attributable primarily to their relatively large surface area.

The concentration of catalytic molybdenum oxide in the supported catalysts influences the conversion per pass. In general, the conversion per pass increases with increase in the concentration of catalytic molybdenum oxide. For example, we have found that a catalyst comprising 20 parts by weight of molybdenum trioxide on 80 parts by weight of activated alumina is more effective than one comprising 10 parts by weight of molybdenum trioxide on 90 parts by weight of activated alumina. It is to be understood, however, that supported catalysts containing larger or smaller amounts of catalytic molybdenum oxides may be used in our process.

We have found also that in order to obtain initial maximum catalytic efficiency, particularly where the catalytic material comprises the higher catalytic molybdenum oxides, that the catalyst should be conditioned prior to use in the process. As defined herein, conditioned catalysts are those which have been exposed to ammonia or hydrogen, or both, for a period of time, several minutes to several hours, depending upon the quantity, at temperatures varying between about 800° F. and about 1300° F. However, if desired, the conditioning treatment may be dispensed with inasmuch as the catalyst becomes conditioned during the initial stages of our process when the catalyst comes in contact with the ammonia reactant.

In operation, the catalysts become fouled with carbonaceous material which ultimately affects their catalytic activity. Accordingly, when the efficiency of the catalyst declines to a point where further operation becomes uneconomical or disadvantageous from a practical standpoint, the catalyst may be regenerated, as is well known in the art, by subjecting the same to a careful oxidation treatment, for example, by passing a stream of air or air diluted with flue gases over the catalyst under appropriate temperature conditions and for a suitable period of time, such as the same period of time as the catalytic operation. Preferably, the oxidation treatment is followed by a purging treatment, such as passing over the catalyst a stream of purge gas, for example, nitrogen, carbon dioxide, hydrocarbon gases, etc.

The reaction or contact time, i. e., the period of time during which a unit volume of the reactants is in contact with a unit volume of catalyst, may vary between a fraction of a second and several minutes. Thus, the contact time may be as low as 0.01 second and as high as 20 minutes. We prefer to use contact times varying between 0.1 second and one minute, and more particularly, contact times varying between 0.5 seconds and 30 seconds.

In general, the temperatures to be used in our process vary between about 550° F. and the decomposition temperature of ammonia (about 1250–1300° F.). Preferably, we use temperatures varying between about 600° F. and about 1050° F. The preferred temperature to be used in any particular operation will depend upon the nature of the primary alcohol reactant used and upon the type of catalyst employed. Generally speaking, the higher temperatures increase the conversion per pass but they also increase the decomposition of the reactants, thereby decreasing the ultimate yields of nitriles. Accordingly, the criteria for determining the optimum temperature to be used in any particular operation will be based on the nature of the primary alcohol reactant, the type of catalyst, and a consideration of commercial feasibility from the standpoint of striking a practical balance between conversion per pass and losses to decomposition.

The process of the present invention may be carried out at subatmospheric, atmospheric or superatmospheric pressures. Superatmospheric pressures are advantageous in that the unreacted charge materials condense more readily. Subatmospheric pressures appear to favor the reactions involved since the reaction products have a larger volume than the reactants and, hence, it is evident from the law of Le Chatelier-Braun that the equilibrium favors nitrile formation more at reduced pressures. However, such pressures reduce the through-put of the reactants and present increased difficulties in recycling unreacted charge materials. Therefore, atmospheric pressure or superatmospheric pressures are preferred.

The reaction mechanism involved is apparently one of replacing the hydrogen and hydroxy radicals on the primary carbon atom with nitrogen from the ammonia, combining the hydroxy radical into water with a part of the hydrogen evolved and freeing the remaining hydrogen as such. In our process, we have noted that considerable amounts of hydrogen are evolved; and that when aliphatic alcohols containing six or more carbon atoms are employed, some aromatic as well as aliphatic nitriles are obtained.

The present process may be carried out by making use of any of the well-known techniques for operating catalytic reactions in the vapor phase, effectively. By way of illustration, propyl alcohol and ammonia may be brought together in suitable proportions and the mixture vaporized in a preheating zone. The vaporized mixture is then introduced into a reaction zone containing a catalyst of the type defined hereinbefore. The reaction zone may be a chamber of any suitable type useful in contact-catalytic operations; for example, a catalyst bed contained in a shell, or a shell through which the catalyst flows concurrently, or counter-currently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or counter-currently, with the reactants in a reaction chamber, the catalyst will be thereafter suitably separated from the reaction mixture by filtration, etc. The reaction mixture will be predominantly a mixture of aliphatic nitriles, hydrogen, unchanged alcohol, dehydration products, and unchanged ammonia. The aliphatic nitriles and unchanged alcohol will be condensed in passing through the condensing zone and will be retained in the receiving chamber. The aliphatic nitriles and alcohols can be separated from each other by any of the numerous and well known separation procedures, such as fractional distillation. Similarly, the uncondensed hydrogen and unchanged ammonia can be separated from each other by said acid scrubbing, etc. The unchanged alcohol and ammonia can be recycled, with or without fresh alcohol and ammonia, to the process.

It will be apparent that the process may be operated as a batch or discontinuous process as by using a catalyst-bed-type reaction chamber in which the catalytic and regeneration operations alternate. With a series of such reaction chambers, it will be seen that as the catalytic operation is taking place in one or more of the reaction chambers, regeneration of the catalyst will be taking place in one or more of the other reaction chambers. Correspondingly, the process may be continuous when we use one or more catalyst chambers through which the catalyst flows in contact with the reactants. In such a continuous process, the catalyst will flow through the reaction zone in contact with the reactants and will thereafter be separated from the reaction mixture as, for example, by accumulating the catalyst on a suitable filter medium, before condensing the reaction mixture. In a continuous process, therefore, the catalyst—fresh or regenerated—and the reactants—fresh or recycle—will continuously flow through a reaction chamber.

The following detailed examples are for the purpose of illustrating modes of preparing nitriles in accordance with the process of our invention, it being clearly understood that the invention is not to be considered as limited to the specific catalysts disclosed therein or to the manipulations and conditions set forth in the examples. As it will be apparent to those skilled in the art, a wide variety of other primary alcohols and other catalysts of the type described hereinbefore may be used.

*Example I*

Normal butyl alcohol and ammonia in a molar ratio of 1:2 were passed over a catalyst consisting of 10% molybdic oxide and 90% activated alumina, used as a support, at atmospheric pressure and at a temperature of 820° F. A liquid space velocity of 0.5 was used. Forty-five per cent of the alcohol was converted to normal butyronitrile in a one-pass operation.

*Example II*

Benzyl alcohol and ammonia in a molar ratio of 1:2 were passed over the same type of catalyst at 800° F., at a liquid space velocity of 0.5. Ten per cent of the benzyl alcohol was converted to benzonitrile in a one-pass operation.

It will be apparent that the present invention provides an efficient, inexpensive and safe process for obtaining nitriles. Our process is of considerable value in making available relatively inexpensive nitriles which are useful, for example, as intermediates in organic synthesis.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

What is claimed is:

1. A process for the production of nitriles, which comprises reacting a primary alcohol with ammonia, in vapor phase, at a temperature between about 550° F. and the decomposition temperature of ammonia, in the presence of a catalyst comprising an oxide of molybdenum.

2. A process for the production of nitriles, which comprises reacting a primary alcohol with ammonia, in vapor phase, at a temperature between about 600° F. and about 1050° F., in the presence of a catalyst comprising a molybdenum oxide, supported on a catalyst support.

3. A process for the production of nitriles, which comprises reacting a primary alcohol with ammonia, in vapor phase, at a temperature between about 600° F. and 1050° F., in the presence of molybdenum trioxide supported on activated alumina.

4. A process for the production of nitriles, which comprises reacting a primary alcohol with ammonia, in vapor phase, at a temperature between about 550° F. and the decomposition temperature of ammonia, in the presence of a catalyst comprising molybdic oxide.

5. A process for the production of nitriles, which comprises reacting a primary alcohol with ammonia, in vapor phase, at a temperature between about 600° F. and about 1050° F., in the presence of a catalyst comprising molybdic oxide supported on a catalyst support.

6. A process for the production of nitriles, which comprises reacting normal butyl alcohol with ammonia, in vapor phase, at a temperature between about 600° F. and about 1050° F., in the presence of a catalyst comprising molybdic oxide supported on activated alumina.

7. A process for the production of nitriles, which comprises reacting benzyl alcohol with ammonia, in vapor phase, at a temperature between about 600° F. and about 1050° F., in the presence of a catalyst comprising molybdic oxide supported on activated alumina.

8. A process for the production of nitriles, which comprises reacting 10 to 40 mol per cent of a primary alcohol with 90 to 60 mol per cent of ammonia, in vapor phase, at a temperature varying between about 550° F. and the decomposition temperature of ammonia, in the presence of a catalyst comprising an oxide of molybdenum.

9. A process for the production of nitriles, which comprises reacting 10 to 40 mol per cent of a primary alcohol with 90 to 60 mol per cent of ammonia, in vapor phase, at a temperature varying between about 550° F. and the decomposition temperature of ammonia, in the presence of a catalyst comprising molybdic oxide.

10. A process for the production of nitriles, which comprises reacting 10 to 40 mol per cent of a primary alcohol with 90 to 60 mol per cent of ammonia, in vapor phase, at a temperature varying between about 550° F. and the decomposition temperature of ammonia, in the presence of a catalyst comprising an oxide of molybdenum supported on a catalyst support.

11. A process for the production of nitriles, which comprises reacting 10 to 40 mol per cent of a primary alcohol with 90 to 60 mol per cent of ammonia, in vapor phase, at a temperature varying between about 550° F. and the decomposition temperature of ammonia, in the presence of a catalyst comprising molybdic oxide supported on activated alumina.

RICHARD B. BISHOP.
WILLIAM I. DENTON.

REFERENCES CITED

The following references are of record in the file of this patent:

UNITED STATES PATENTS

| Number | Name | Date |
|---|---|---|
| 2,033,866 | Schrauth | Mar. 10, 1936 |
| 2,053,193 | Guinot | Sept. 1, 1936 |
| 2,337,421 | Spence et al. | Dec. 21, 1943 |
| 2,337,422 | Spence et al. | Dec. 21, 1943 |
| 2,388,218 | Olin | Oct. 30, 1945 |